United States Patent [19]

Tuttle et al.

[11] Patent Number: 5,613,228
[45] Date of Patent: Mar. 18, 1997

[54] GAIN ADJUSTMENT METHOD IN TWO-WAY COMMUNICATION SYSTEMS

[75] Inventors: John R. Tuttle; Charles K. Snodgrass, both of Boise, Id.

[73] Assignee: Micron Technology, Inc., Boise, Id.

[21] Appl. No.: 430,711

[22] Filed: Apr. 27, 1995

Related U.S. Application Data

[63] Continuation of Ser. No. 206,471, Mar. 3, 1994, abandoned, which is a continuation of Ser. No. 909,370, Jul. 6, 1992, abandoned.

[51] Int. Cl.⁶ ............................................. H04B 1/02
[52] U.S. Cl. ..................... 455/127; 455/38.3; 455/70; 455/92; 340/825.06; 340/539
[58] Field of Search ........................... 455/15, 127, 126, 455/72, 116, 115, 117, 92, 88, 38.3, 69, 67.1, 343, 70, 32.1, 38.2, 38.5, 68; 340/825.06, 825.03, 533, 537, 539; 375/345

[56] References Cited

U.S. PATENT DOCUMENTS

| | | | |
|---|---|---|---|
| 3,986,119 | 10/1976 | Hermmer, Jr. et al. | 455/15 |
| 4,741,018 | 4/1988 | Potratz et al. | 455/72 |
| 4,811,421 | 3/1989 | Havel et al. | 455/126 |
| 4,868,795 | 9/1989 | McDavid et al. | 455/69 |
| 5,003,619 | 3/1991 | Morris et al. | 455/127 |
| 5,220,678 | 6/1993 | Feei | 455/127 |
| 5,278,992 | 1/1994 | Su et al. | 455/69 |

*Primary Examiner*—Chi H. Pham
*Attorney, Agent, or Firm*—Henri J. A. Charmasson; Robert J. Stern

[57] ABSTRACT

A method for minimizing the power used by a remote transceiver in 2-way communication between local and remote transceivers. By repeatedly transmitting a signal with successively increasing power from one transceiver until a response is received from the other transceiver, the dynamic range and hence complexity of the receiving circuit may be greatly reduced. The operating power of the remote transmitter can then be adjusted according to the level used by the local transmitter, thereby promoting the efficent use of the remote's power supply.

3 Claims, 3 Drawing Sheets ns,228

GAIN ADJUSTMENT METHOD IN TWO-WAY COMMUNICATION SYSTEMS

This application is a continuation of copending application Ser. No. 08/206,471 filed Mar. 3, 1994, now abandoned.

FIELD OF THE INVENTION

This invention relates to 2-way RF data communication between transceivers, specifically to automatic gain control (AGC) in receiver circuits of such transceivers, and more particularly, to the efficient use of the limited power and space available to such transceivers when used as radio frequency identification tags.

BACKGROUND OF THE INVENTION

Often times a given transceiver system is required to operate under widely varying conditions. When the distance between local and remote transceivers varies greatly, the power required to communicate varies accordingly. In the far field, the power required is dictated by the inverse square law: ideally, every time the distance is doubled the power required must be quadrupled. Other factors also impinge on the ability of two transceivers to communicate. Multipath and outside RF source interference can further effect the required transmission level.

In the field of self contained, low power remote transceivers of the type used in RFID tags, there is the added design constraint of package size, available power, and cost. Typically, RFID tags must be small and light-weight, about the size of your average WHEAT THIN brand crackers. Often, this requires the transceiver circuitry be incorporated into a single integrated circuit chip with a very small battery as a power supply.

To conserve the limited power afforded by a small battery, signal transmissions should be as efficient as possible. The tag should use as little power as possible during non-communicating operation. Simpler circuit design dissipates less power and is cheaper to construct.

SUMMARY OF THE INVENTION

The principal and secondary objects of this invention are to provide a method by which the efficiency in communication between local and remote RF transceivers can be further maximized and to reduce complexity of AGC circuits required in the receiver portions of remote transceivers. It is an additional object of this invention to minimize the power used in generating a response by the remote transceiver.

These and other objects are achieved by sending successively stronger transmissions from the local transceiver (interrogator) trying to establish the communications link, beginning with minimum power, until a response is received from the remote transceiver (tag). The remote transceiver will use information in the signal received in order to decide on the power level used by its transmitter.

Optimally, the tag should remain in a quiescent sleep state using little power during periods of non-communication. When the tag is close to the interrogator, it will wake up from this state when the interrogator transmits at a relatively low power level. When the distance between tag and interrogator is large, the tag will awaken when the interrogator transmits at a relatively high power level. However, the power of the signal received by the tag will be about the same, whether near or far, thus reducing the flexibility required by the tag's receiver circuitry.

DESCRIPTION OF THE PREFERRED EMBODIMENTS OF THE INVENTION

Figure 1:
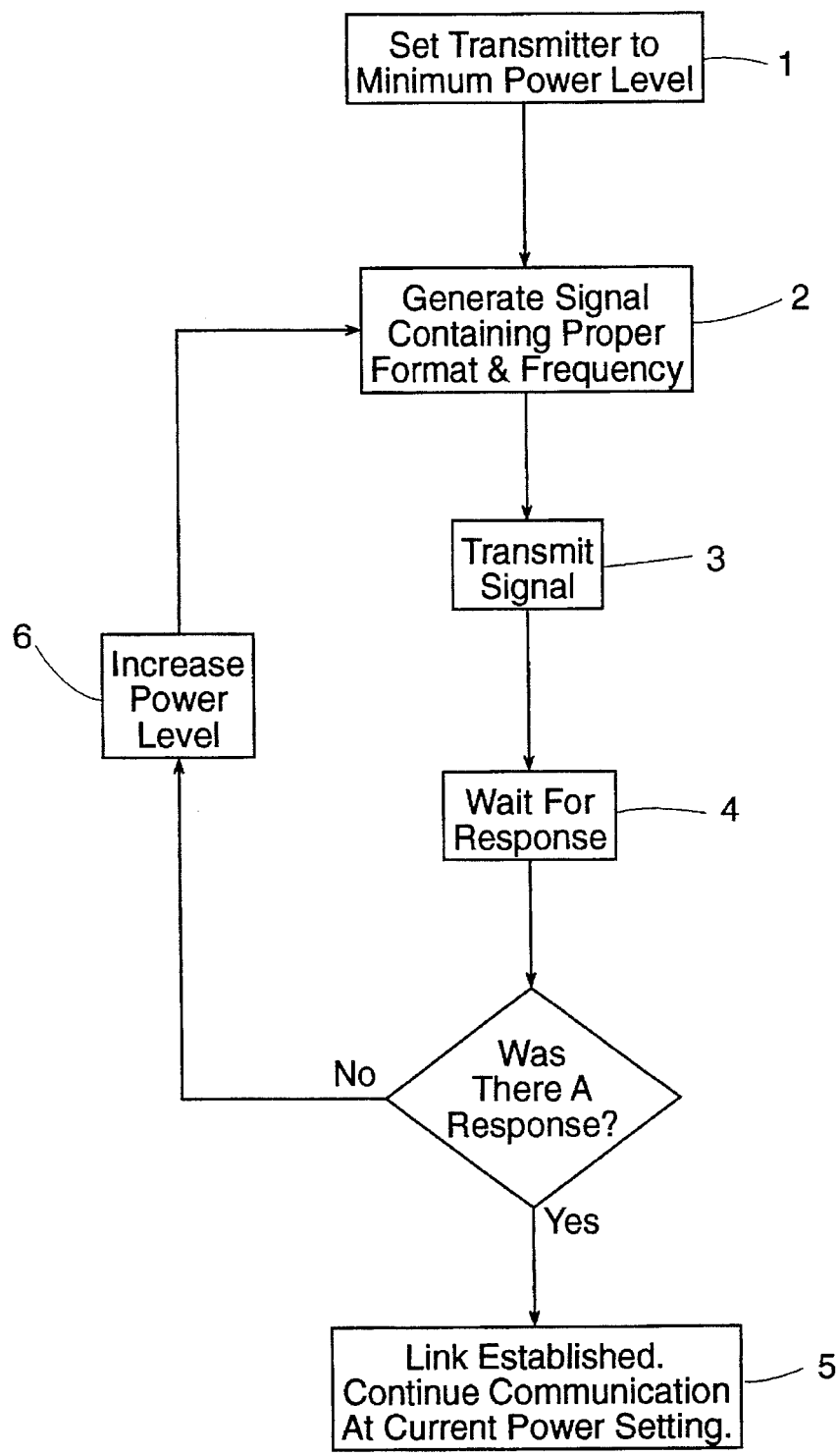
FIG. 1 is a flow chart diagram of the steps taken by the local interrogator transceiver to establish a communication link at an efficient power level.

Referring now to the drawing, the first step in establishing an efficient communication link from interrogator to RFID tag is setting the transmitter of the interrogator transceiver to a minimum power level 1.

Next, a signal to be transmitted is generated within the interrogator transceiver 2. The frequency and format of this signal is appropriate for sensing by the tag's "wake up" receiver circuit. Part of the informational content of this signal is encoded to reflect the current transmitter power level.

The signal is then transmitted using the current transmitter power setting 3. The first time this is done, the minimum power setting is used.

After the signal is sent, the interrogator must wait for a brief period of time 4 for the RFID tag transceiver to respond with a signal of its own.

If the RFID tag transceiver has sent a response and the interrogator has received it, the interrogator will assume that an adequate communication link has been established and will begin communicating information with the RFID tag transceiver 5. To improve the signal to noise ratio (SNR) of further communication, the subsequent transmission(s) could be at a predetermined higher level.

If on the other hand, the RFID tag did not send a response or the interrogator did not receive the response, the interrogator will assume that the broadcast output power of the last transmitted signal was too weak. The interrogator will then increase the power level setting on its own transmitter 6, change the informational content of the signal to be sent reflecting the increase in power 2, and send another signal 3. This signal will be just like the first except for an increase in power and the corresponding change in its informational content. Therefore, when the RFID tag transceiver receives a signal, the last used transmission power level of the interrogator can be considered by the RFID tag in determining the minimum effective transmission power level of its response.

This loop continues until a response from the RFID tag transceiver is received or until the maximum allowable transmitter level is attained, in which there will be no communication link established, and the entire process can start over.

Figure 2:
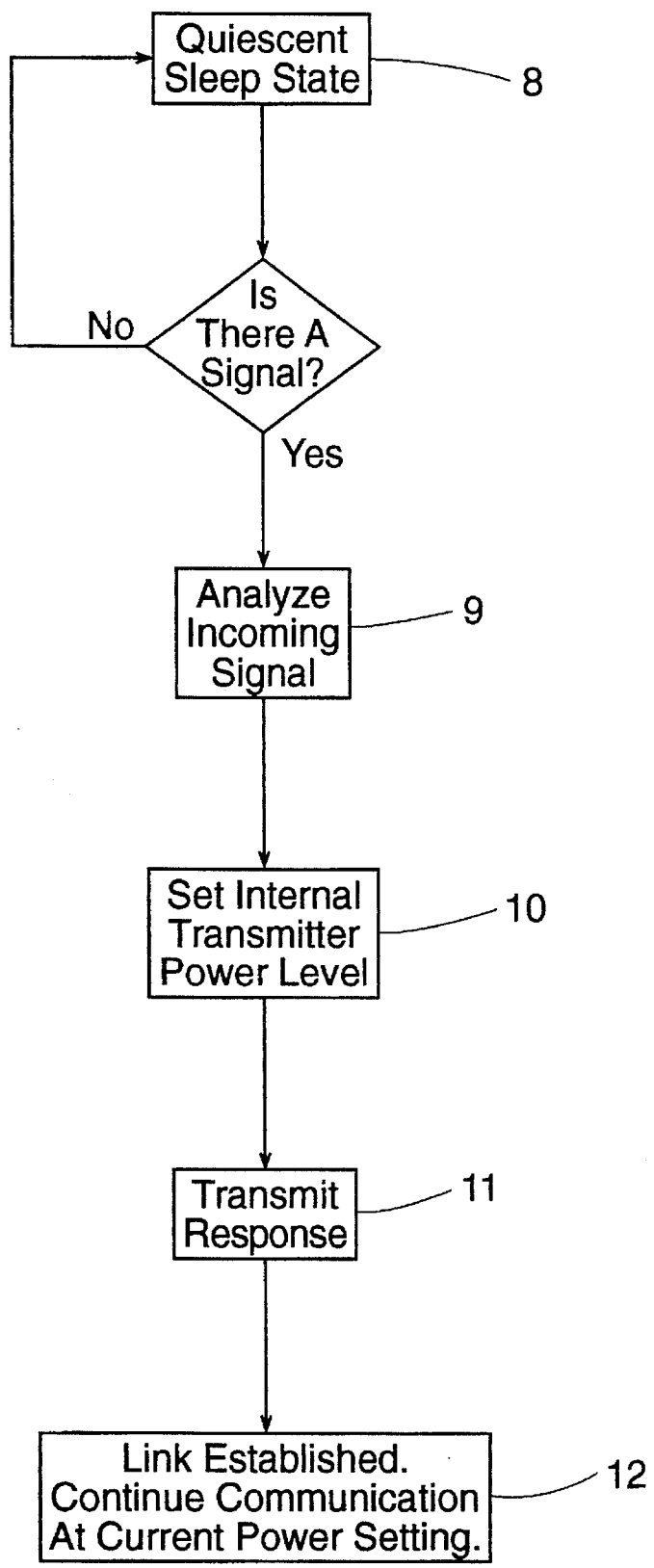
FIG. 2 is a flow chart diagram of the steps taken by the remote RFID tag transceiver in transmitting a response at an efficient power level.

Referring now to FIG. 2, the RFID tag is normally in a quiescent sleep state 8 using very little power, waiting for a signal from the interrogator.

When a signal of the proper format and frequency arrives, the RFID tag immediately awakens from its sleep and analyzes the incoming signal 9. The tag interprets the information in the signal, then determines and sets the power level on its own transmitter 10 according to the amount of power the interrogator used to send the signal. The tag then transmits its response 11.

Figure 3:
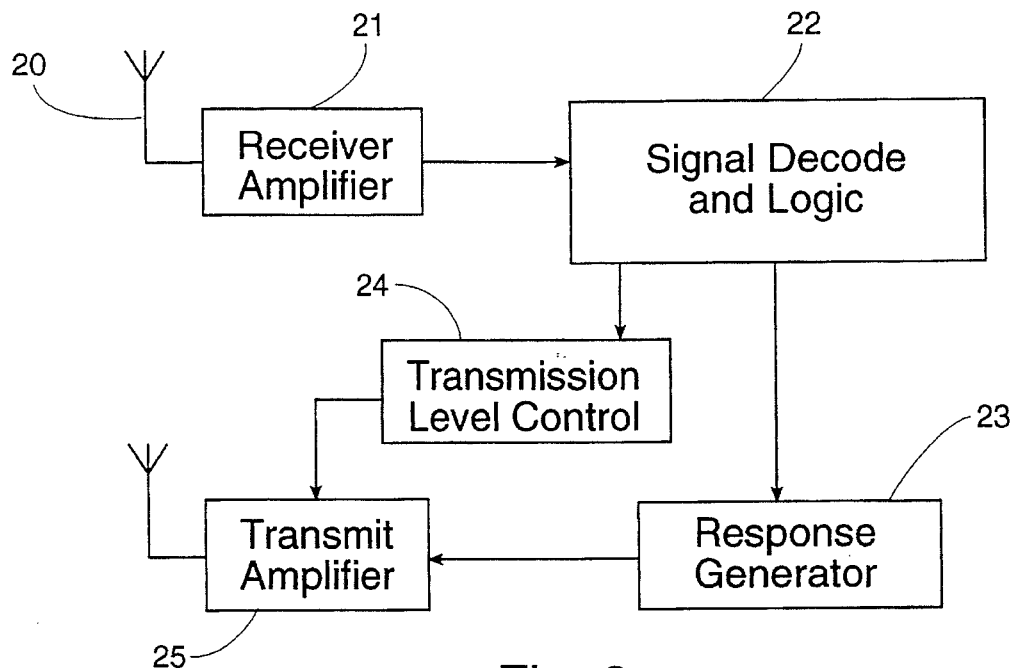
FIG. 3 is a block diagram of the self contained, low power remote transceiver.

The communication link between tag and interrogator has been established, and further information can be exchanged between them 12. FIG. 3 shows a simple block diagram of the remote transceiver. Radio frequency signals are received by an antenna 20 and amplified 21. The signal is then decoded 22, analyzed and the logic of FIG. 2 implemented such that a proper response can be generated 23. Information regarding the power to be used in transmitting the response is also decoded from the signal and sent to the transmission power control circuitry 24 which controls the power used by the transmitter amplifier 25.

Figure 4:
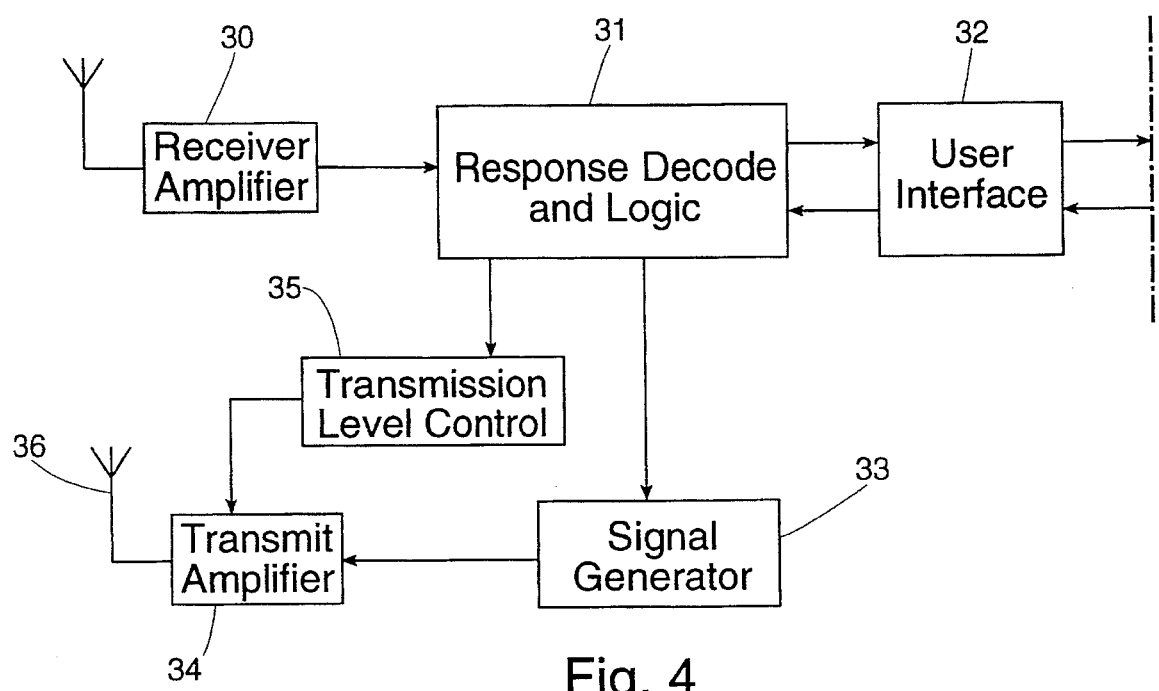
FIG. 4 is a block diagram of the local interrogator transceiver.

Similarly, FIG. 4 shows the local transceiver. Radio frequency responses are received and amplified 30 and decoded 31, and the logic of FIG. 1 is implemented in accordance with any user input parameters through an interface 32 so that a proper signal can be generated 33. The signal is amplified 34 to the proper level by the transmission level control 35 and transmitted through antenna 36. Of course, the local transceiver can be far more complicated depending on the application and capabilities since there are fewer power and size constraints.

In an alternate embodiment, the interrogator first sends out a relatively high power wake-up call signal to identify those tags within a certain range. Then the interrogator can initiate a similar sequence to establish communication at an efficient power level within the tag.

While the preferred embodiments of the invention have been described, modifications can be made and other embodiments may be devised without departing from the spirit of the invention and the scope of the appended claims.

What is claimed is:

1. A method of reducing the dynamic range reception requirements of an RF identification tag transceiver in RF communication with a local transceiver, the RF identification tag transceiver being smaller and lighter than the local transceiver, comprising the steps of:

A. the local transceiver transmitting to the RF identification tag a first RF signal having a minimum power level;

B. the local transceiver waiting to receive a response RF signal from the identification tag; and C. subsequently, if the transceiver fails to receive a response during the waiting step, repeating steps A and B using successively higher powers to transmit the first RF signal in each successive repetition of step A;

D. whereby the local transceiver avoids sending unnecessarily powerful signals to the RF identification tag transceiver, thereby reducing the dynamic range of RF signals which the RF identification tag transceiver must be capable of receiving.

2. A method according to claim 1, further comprising the step of:

after the local transceiver receives a response RF signal from the RF identification tag, the local transceiver transmitting to the RF identification tag additional information-containing RF signals at a power level higher by a predetermined amount than the power level of the first RF signal transmitted by the local transceiver to which the identification tag responded with said response.

3. A method according to claim 2, wherein:

step A further includes the step of the local transceiver encoding the first RF signal to indicate the power used by the local transceiver to transmit the first RF signal; and the method further comprises the step of, if the RF identification tag transceiver receives a first RF signal from the local transceiver, then the RF identification tag transceiver transmitting a response RF signal having a power level established by the tag according to the power level encoded in the first RF signal received by the tag.

* * * * *